United States Patent
Belik et al.

[11] Patent Number: 6,043,293
[45] Date of Patent: Mar. 28, 2000

[54] FOAMABLE POLYVINYL HALOGENATED RESIN MASS, USE OF POLYMERIZATES THEREOF AS PROCESSING AIDS AND OBJECTS FORMED THEREFROM

[75] Inventors: Pavel Belik, Rodenbach; Georg Schneider, Freigericht; Klaus Dorn, Hanau; Stefan Forster, Burghausen; Bernd Frischkemuth, Munich, all of Germany

[73] Assignees: Agomer Gesellschaft mit beschrankter; Barlocher Gesellschaftmit beschrankter Hatfung, both of Germany

[21] Appl. No.: 09/174,874

[22] Filed: Oct. 19, 1998

[30] Foreign Application Priority Data

Oct. 20, 1997 [DE] Germany .......................... 197 46 006

[51] Int. Cl.⁷ ...................................................... C08J 9/00
[52] U.S. Cl. ........................................... 521/134; 521/145
[58] Field of Search ..................... 521/145, 134

[56] References Cited

U.S. PATENT DOCUMENTS 2,808,387 10/1957 Parks et al. .............................. 521/134
3,975,315 8/1976 Parks ....................................... 521/134
5,710,188 1/1998 Beekman et al. ........................ 521/145
5,786,399 7/1998 Beekman et al. ........................ 521/134

*Primary Examiner*—Morton Foelak
*Attorney, Agent, or Firm*—Omri M. Behr, Esq.

[57] ABSTRACT

There are provided foamable, foamable polyvinyl halide resin masses containing: A) 1 to 25 parts relative to 100 parts of polyvinyl halide, of a polymerizate obtainable through the emulsion polymerization of i) up to 20 to not more than 75 parts of methylmethacrylate, ii) 25 to 80 parts of one or more $C_2$–$C_{18}$ alkylmethacrylates, iii) 0 to 5 parts of one or more vinyl unsaturated monomers copolymerizable with (i) and/or (ii, wherein the components (i)–(iii) together yield 100 parts and are polymerized with up to a further 100 parts of usual additives for emulsion polymerization, wherein the emulsion polymerizate is single stepped and has a viscosity number of >700 $cm^3/g$ and wherein copolymers are excluded which contain iv) MMA per se, or less than 20 or more than 75 parts of MMA together with either v) one or more acrylic acid esters, and/or vi) ethyl methacrylate, n-butyl-methacrylate, or ethylhexyl methacrylate. The resin mass further includes: B) 0.1–10 parts based on 100 parts of the polyvinyl halide of one or more foaming materials, C) 0–100 parts based on 100 parts polyvinyl halide of the usual additives. This polyvinyl halide resin mass, after foaming, yields a resin mass which, as well as of good surface properties, has a foam density of <0.7 $g/cm^3$.

12 Claims, No Drawings

FOAMABLE POLYVINYL HALOGENATED RESIN MASS, USE OF POLYMERIZATES THEREOF AS PROCESSING AIDS AND OBJECTS FORMED THEREFROM

FIELD OF THE INVENTION

The invention involves foamable, especially freely foamable polyvinyl halogenated resin masses, which contain a methyl methacrylate (MMA) based polymerizate as processing aid. The invention also involves the use of polymerizates as processing aids in foamable, in particular freely foamable polyvinyl halogenated resin masses. Furthermore, the invention is directed to articles made from freely foamable polyvinyl halogenated resin masses.

DISCUSSION OF THE PRIOR ART

In German Patent DE 22 60 284, there are disclosed single step foam stabilizers which are utilized for the formation of a hard foamed vinyl chloride polymer. These foam stabilizers contain an alkyl acrylate homopolymer or an alkyl acrylate copolymer with up to 40 wt. % of one or more co-monomers and are utilized in an amount of 0.2 to 5 wt. % relative to the vinyl chloride polymer in the composition.

British Patent GB 2 139 629 is directed to foamed polyvinyl chloride masses to which an acrylate polymerizate is added for purposes of foam stabilization. As acrylate polymerizates there are disclosed:

a) MMA polymers,
b) copolymers based on MMA, namely from
b1) MMA and acrylic acid esters such as methyl acrylate, ethyl acrylate, n-butyl acrylate and the like, or from
b2) MMA, acrylic acid esters and further containing copolymerizable monomers such as EMA (ethyl methacrylate), n-BMA(n-butyl methacrylate), and 2-EHMA (2-ethyl hexylmethacrylate), etc.

For the acrylate polymerizate, values of at least 3 dl/g are preferred for a reduced viscosity number of >300 cm$^3$/g are preferred. In accordance with Examples 1 through 10 however a polymerizate of MMA and n-BA (butyl acrylate) having a viscosity number of 1150 cm$^3$/g are utilized.

EP 0 495 231 discloses a processing aid for foamable PVC resin masses by which the foam density in the formed objects is reduced. This is achieved by means of 2-stage emulsion polymerizates the so-called core gel polymerizates. Therein the viscosity numbers of the utilized emulsion polymerizate lie in the region of 175 cm$^3$/g. The foam density which is achieved by means of such an emulsion polymerizate which respect to a polyvinyl resin mass, is given as 0.46 g/cm$^3$.

In practice however, up till the present time, foam densities of <0.6 g/cm$^3$ have not been realized in foam plates which have been formed by extrusion.

Foamable polyvinyl halo resin masses with low foam density are viewed as of particular economic interest. Objects can be formed from such foams which, despite substantial dimensions, nevertheless have a low weight.

As described in the state of the art, for example in (translated) Synthetic Additives by Gaechter/Muller (published by Carl Hanser), processing aids of emulsion polymerizates are utilized in foamable polyvinyl resin masses, which may be characterized by viscosity number levels of 330 to 600 cm$^3$/g. While the utilization of such emulsion polymerizates can reduce the foam density of polyvinyl resin masses, there is produced a foam which has rather coarse pores and thus an uneven, irregular and rough surface state.

SUMMARY OF THE INVENTION

The object of the present invention is to provide foamable, especially freely foamable, polyvinyl halogenated resin masses for foams which have improved surface qualities with lower foam density.

A further task resides therein to find processing aids based on emulsion polymerizates which, on the one hand reduce the foam density of the polyvinyl resin, for example, to keep down the foam density with reduced charge amounts and on the other hand, nevertheless ensure that the surface qualities are not negatively influenced.

Yet another task is the production of formed objects of foamed, preferably freely foamed through extrusion from polyvinyl halide resin masses.

These tasks, as well as those not specifically recited which can be readily deduced from the introductory discussions of the state of the art, are solved by a polyvinyl halide resin mass having the characteristics set forth below. In the directly or indirectly dependent subclaims and adjacent claims, particular embodiments of the invention are intended to be protected.

Herein all parts are parts by weight.

There are provided foamable, in particular freely foamable polyvinyl halide resin masses containing A) 1 to 25 parts relative to 100 parts of polyvinyl halide used, of a polymerizate obtainable through the emulsion polymerization of
 i) not less than 20 to not more than 75 parts of methylmethacrylate,
 ii) 25 to 80 parts of one or more $C_2$–$C_{18}$ alkylmethacrylates,
 iii) 0 to 5 parts of one or more vinyl unsaturated monomers copolymerizable with (i) and/or (ii), wherein the components (i)–(iii) together yield 100 parts and are polymerized with up to a further 100 parts of usual additives for emulsion polymerization, wherein the emulsion polymerizate is single stepped and has a viscosity number of >700 cm$^3$/g and wherein polymers are excluded which comprise
 iv) MMA per se, or copolymers comprising a major portion of MMA specifically less than 20 or more than 75 parts of MMA together with either
 v) one or more acrylic acid esters, and/or
 vi) ethyl methacrylate, n-butylmethacrylate, or 2-ethylhexyl methacrylate.

The resin mass further includes:

B) 0.1–10 parts based on 100 parts of the polyvinyl halide of one or more foaming materials, C) 0–100 parts based on 100 parts polyvinyl halide of the usual additives.

This provides a polyvinyl halide resin mass which, after foaming, yields a resin mass which, in the presence of good surface properties, has a foam density of <0.7 g/cm$^3$, preferably <0.5 g/cm$^3$.

Such foamed polyvinyl halide resin masses are especially suitable for formation of synthetic objects which comprise a very smooth surface and the lowest possible foam density.

The particularly preferred objects of the present invention are free foamable polyvinyl halide resin masses. The term "freely foamable" represents a continuous foaming process in which the polymer resin mass comes from one direction and can foam freely into the remaining five-space directions without the need for the foam to work against pressure which is greater than the momentarily applicable atmospheric pressure.

The foam masses in accordance with the present invention also show outstanding qualities when they are not foamed free but under restriction, by which it is understood that the foam operates against solid outer walls (integral foam).

Polyvinyl halide resin masses in accordance with the present invention include at least a polyvinyl halide. In this group should be included among others, polyvinyl fluoride and polyvinyl chloride.

With respect to the present invention, polyvinyl halide in the polyvinyl halide resin mass refers to homo-polymers of vinyl chloride and copolymers containing at least 80 wt. % of vinyl chloride.

Suitable ethylenically unsaturated co-monomers are, for example vinyl acetate, vinyl ether, vinylidene chloride, alkyl acrylate, and olefines such as ethylene and propylene. Preferred among the polyvinyl halides in the formed masses in accordance with the present invention is polyvinyl chloride.

DESCRIPTION OF THE PREFERRED EMBODIMENTS

The Components (A) of Polyvinyl Halide Resin Mass

The component A of the polyvinyl halide resin mass is an essential component thereof. One is concerned with an emulsion polymerizate in the quantity of 1–25 parts relative to 100 parts of polyvinyl halide in the entire mass.

At a level of less 1 part, the foam density as well as the surface of the formed objects obtained, have inadequate qualities while amounts of more than 25 parts do not show an improvement in foam density and surface qualities which are justified by the expenditure.

It is preferred that the polyvinyl halide resin mass contain 5–25 parts of (A). Particularly preferred is the use of 5–20 parts of (A). Especially favored is the use of 7–18 parts of the processing aid (A) based upon the polyvinyl halide used.

The emulsion polymerizates of the present invention, are charged as processing aids in the freely foamable polyvinyl halide resin mass. Generally speaking, one is concerned with single step emulsion polymerizates. By the term "single step emulsion polymerizates" there is understood a polymerizate which is not built from two different phases, such as for example, is the case with the core shell polymers. In addition to the one-step emulsion polymerizates, there may be used lesser quantities of a single or multi-step emulsion polymerizate as well, as component (A). Lesser quantities means that up to 20 wt. % of the component (A) may comprise two- or multi-stage emulsion polymerizates.

In the framework of the present invention it is also possible to designate such "two or multi-step" emulsion polymerizates as single step, in which the core and shell, or peel comprise basically the composition of component (A). The polymerizate (A) can be formed by emulsion polymerization of particular components (i) through (iii) in a generally known fashion.

The Components (i) of the Emulsion Polymerizate (A)

Herein, one is concerned essentially with methyl methacrylate (MMA) which is utilized in between 20–75 parts (relative to 100 parts of component A) in the formation of the monomer mixture. utilized in component (A). If the amount thereof is less than 20 parts or more than 75 parts, the desired effect in accordance with the present invention does not occur.

The Components (ii) of the Emulsion Polymerizate (A)

One is here concerned with $C_2$–$C_{18}$ alkyl methacrylates. Alkyl acrylates a re specifically excluded from the group comprising components (ii). There may be utilized one or more thereof. Under the term "$C_2$–$C_{18}$ alkyl methacrylates", in accordance with the present invention, there are understood esters of methacrylic acid with alcohols which have an alkyl chain of 2–18 carbon atoms, which chain may be linear or branched as desired so that in these chains secondary and tertiary carbon atoms may also occur.

As component (ii) it is preferred to select the group: $C_2$–$C_4$ alkyl methacrylates. Under the concept of $C_2$–$C_4$ alkyl methacrylates, one understands the esters of methacrylic acid with alcohols having a chain length of $C_2$–$C_4$ which, as desired, may be linear or branched. In particular, as alcohols, there may be utilized: ethanol n-propanol, n-butanol, isopropanol, isobutanol, secondary butanol, and tertiary butanol. It is particularly preferred to utilize n-butyl methacrylate and/or isobutyl methacrylate as component (ii). Herein, it is particularly advantageous to utilize n-butyl methacrylate in a concentration range of 25–40 parts relative to 100 parts of total weight of components (i), (ii) and (iii) of the emulsion polymerizate. In contrast thereto, it is advantageous to utilize isobutyl methacrylate in a concentration range of 60–80 wt. % relative to the total weight components (i), (ii), and (iii) of the emulsion polymerizate.

The Components (iii) of the Emulsion Polymerizate (A)

Herein, one is concerned about the optimal compositions of component (A). Herein there may be considered all monomers co-polymerizable with (i) or (ii) or (i) and (ii), which do not adversely change the operation of emulsion copolymerizate (A). The amount of (iii) is limited to a maximum of 5 parts relative to 100 parts of the total weight of A. In this low proportionate region, it is generally found that no unusable results will occur.

Suitable monomers are, among others: monoethylenically unsaturated carboxyl group free-monomers, for example hydroxy methacrylate with $CH_{2x}OH$ as ester groups, wherein x is 2–4; (meth)acrylamide, (meth)acrylonitrile, vinylsulfonic acid, allylsulfonic acid, diemthylaminoethyl (meth)acrylate, diethylaminoethyl (meth)acrylate, vinylphosphonic acid, allylphosphonic acid, allyl alcohol, vinyl glycol, vinyl acetate, allyl acetate, vinyl pyrrolidone, N-vinyl formamide, N-vinyl imidazole, N-vinyl imidazoline, 1-vinyl, -2-methyl-2-imidazoline. Also included are alcohol and amino-functionalized esters of (meth)acrylic acid, with 1–8 C-atoms in the alcohol residue such as for example, methyl(meth)acrylate, ethyl(meth) acrylate, propyl (meth)acrylate, butyl(meth)acrylate, ethylene, propylene, methylvinyl ether, ethylvinyl ether, styrene and methyl styrene, functionalized with alcohol or amino groups. All monomeric acids or bases can, in fact, also be utilized as their salts. Polyethylenically unsaturated monomers such as for example the esters of allyl alcohols with (meth)acrylic, maleic as well as fumaric acids, multiple esters of polyols with (meth)acrylic, maleic, as well as fumaric acids, polyallyl and polyvinyl combinations such as for example triallyl amine, tetraalkyl ethylene diamine, polyethylene glycol divinyl ether, trimethylol, propandiallyl ether, butandiol diallylether, pentaerythrit-triallylether, and divinyl urea, are also included.

As monomers (iii), there may be included such polymer components that were chemically modified under the chosen reaction conditions relative to the corresponding starting materials. As monomers (iii) there may be utilized one or more of the above-mentioned combinations. In a preferred variant, the component (A) is free of monomers, that is to say, that the amount of (iii) is 0. In this case, the polymerizate (A) comprises (i) 20–75 parts MMA and (ii) 25–80 parts $C_2$–$C_{18}$ alkyl meth-acrylate to a total of 100 parts.

The components (i) to (iii) for the emulsion polymerization are polymerized with up to an equal weight of the usual additives. As such additives, there may be included emulsifiers and initiators.

As emulsifiers, there may be utilized alkali salts of long chain fatty acids, alkyl sulfates, alkyl sulfonates, alkyl sulfosuccinates, alkylated aryl sulfonates, or alkylated biphenyl ether sulfonates, salts of abietic acid or its derivatives, sulfosuccinic acid ester as well as nonionic block-copolymers.

As initiators, there may be utilized sodium, potassium, or ammonium persulfate, tertbutyl hydroperoxide, water soluble azo compounds, as well as salts of 4,4'azobis(4-cyanobentoic acid) or 2,2'-azobis(2-amidinopropane hydrochloride). For polymerization at relatively low temperatures, redox systems are particularly suitable, such as those comprising a persulfate or a hydroperoxide as well as a reducer in combination with an ion (2) salt. Suitable reducing agents are sodium metabisulfite and ascorbic acids.

Polyvinyl resin masses resulting in foamed articles having particularly smooth surface and particularly low foam density can be produced with emulsion polymerizates which have the above-identified combination and have a viscosity number in the preferred range of 750–1250 $cm^3/g$. It is particularly desirable to operate in the viscosity number range of 800–110 $cm^3/g$.

The Component B) of the Polyvinyl Halide Resin Mass

As blowing material for the polyvinyl halide resin mass, there may be used any commercially available blowing material generally known to one skilled in the art. Examples of such agents include but are not limited to materials, generally speaking solvents, which dissociate on heating and generate a gas thereby which occasions the foaming, liquids which upon heat or reduction of pressure cause foaming (such as pentane, hexane and the like, or gases The temperature at which the solid blowing agents dissociate under the generation of the gas and the vaporization temperature of the liquid blowing agents is generally speaking designated as the activation temperature. It is however generally preferred to utilize, in the present invention, disassociatable blowing agents. The dissociated blowing agents, generally speaking, utilize an amount of between 0.1–2 parts by weight relative to 100 parts of vinyl chloride polymer in the foamable composition, preferably there are utilized between 0.25 and 1 parts by weight. As particularly suitable blowing agents, there may be mentioned those which generate nitrogen, for example, organic uso- hydrazo- and nitroso combinations such as azodicarbonamide, nitrosopentamethylene-tetramine, p,p'-oxy-bis-sulfonyl hydrazide, benzosulfohydrazide, citric acid and also those which generate carbon dioxide such as carbonates and bicarbonates, for example sodium carbonate. Included in the group of blowing agents are proprietary agents such as Tracel 3140 ACR (manufactured by the TRAMCO company).

In any event, it is desirable that a nucleating agent remains in the foamable material in order to provide locations for bubble formation. In certain cases, it could be unnecessary to provide a foaming agent into the foamable composition since certain combinations are self-foaming. Included in this group are, for example, vinyl chloride/methylmethacrylate copolymers which are self-foaming in that upon heating they generate methyl chloride.

The Components C) of the Polyvinyl Halide Resin Mass

Under the term "usual additives" one would understand, for example materials for modification of the impact tenacity, form retention stability under warming, and resistance to weathering, as well as stabilizers, suitably, organo tin mercaptides and sulfides, Ca/Zn stabilizers, lead stearate, sulfate phthalate and carbonate; lubricants, suitably phthalic acid esters, polyethylene waxes and fatty acids; fillers suitably, finely divided surface treated chalks, dyes, and pigments such as titanium dioxide (Rutile type). In general, the total amount of further additives lies in the range of 0–100, suitably under 40, in particular under 30 parts relative to 100 parts of polyvinyl halide.

A further object of the invention is the utilization of the herein described emulsion polymerizates as processing aids in the freely foamable polyvinyl halide resin mass for formation of foams having improved surface qualities with reduced foam density.

Included in the scope of the invention are also formed objects made of polyvinyl halide resin mass, as are described hereinbelow.

The following inventions are intended to illustrate the invention, but under no circumstances should they be considered to restricted thereto.

EXAMPLES

Example 1

Formation of a High Molecular Weight Emulsion Polymerizate

In a suitable reaction vessel provided with a stirrer, reflux condenser, and nitrogen input means, there are charged 754 parts of deionized water and 0.02 parts of sodium hydroxide. The mixture is purged with nitrogen and warmed to 75° C. Upon reaching the desired temperature, there is added a mixture comprising:

193 parts of deionized water
4 parts of sodium lauryl sulfate
350 parts of methyl(meth)acrylate
150 of n-butyl(meth)acrylate Thereafter, 0.1 parts of sodium peroxydisulfate in 2 parts of water and 0.2 parts of sodium hydrogen sulfite in 4 parts of water are added to the reaction vessel.

After further 35 minutes of reaction, the temperature is reduced to room temperature and the polymerizate isolated by spray drying. The viscosity number of the resulting polymer lies at 1040 $cm^3/g$. This, as well as further viscosity values, were determined in accordance with the procedures of DIN 51 562, Parts 1 and 3, describe the procedure and the evaluation of the viscosity number. The exact measuring conditions, solutions, measuring temperature, capillary type and so on, are those set forth in DIN 77 45, Part 2, supplement A, with the difference that the concentration was lowered to 0.1.25 g/l.

Example 2
Charging of High Molecular Weight Emulsion Polymerizate into a PVC Free Foam Receptacle The testing of high molecular weight copolymerizate from Example 1 occurred in a currently available free foam receptacle.

100 parts of suspension polymerized PVC (K-value 58/60)
5 parts chalk
4 parts titanium dioxide
1.5 parts butyl tin mercaptide
2.5 parts calcium stearate
2.7 parts of Tracel 3140 ACR
10–12 parts of polymerizate The contents of the receptor are mixed in a conventional heating/cooling mixer up to a preparation temperature of 115–120° C. Thereafter, it is cooled down in the cooling mixture to 40° C. After 1 day storage of the dry blend a foam extrusion is carried out in a twin screw extruder. Upon exit from the device, a PVC material foams in accordance with free foam procedures. There are produced 20 cm wide foam plates which are drawn off over a tempered rolling mill. The density and the quality of the surface can be determined from these freely foamed plates.

As an example of a commercially available marketable product (standard) a MMA/n-BMA-emulsion polymerizate comprising 80 parts of methyl(meth)acrylate and 20 parts of n-butyl(meth)acrylate and a viscosity number of 550 cm$^3$/g were also tested. These show that with 12 parts of charged material, a foam density of 0.55 g/cm$^3$ is obtained. When the charged mass is reduced to 11 or 10 parts, there is obtained a higher foam density. Where there is charged less than 10 parts, only rough and uneven surfaces are obtained.

The quality of the upper surface is assessed visually and (in the following table) is classified in three quality classes, namely:

+ smooth, shiny homogeneous surface
0 rough, matte homogeneous surface
− rough, matte inhomogeneous surface with tears and stipples.

In certain circumstances, the quality of the upper surface was determined by a surface roughness measuring apparatus (Perthometer-manufactured by the Hoffmann Company of Munich; type: Surftest 301).

Additionally, in individual cases, the average surface roughness depth ($R_z$) was measured by a surface roughness measuring device (perthometer) manufactured by the Hoffmann Company, Munich; type: Surftest 301).

The determination of the surface roughness around $R_z$ by an electrical test cut apparatus (Surftest 301) took place in accordance with the standards DIN 4777 and 4768 T 1; 8.74.

In the following Table 1, there are provided the $R_z$ values, that is to say, the average roughness depth. In particular, the $R_z$ is the arithmetic mean of individual roughness depths ($Z_1$, $Z_2$, $Z_3$, $Z_4$, $Z_5$) of 5 mutually neighboring individual measurement strips.

TABLE 1

| Processing Aid | Standard | Standard | Example 1 | Example 1 | Example 1 | Example 1 | Example 1 | Example 1 |
|---|---|---|---|---|---|---|---|---|
| Charge Amount Parts/100 | 12 | 10 | 12 | 11 | 10 | 9 | 8 | 7 |
| Density g/cm$^3$ | 0.55 | 0.59 | 0.45 | 0.45 | 0.45 | 0.45 | 0.47 | 0.50 |
| Average Roughness Depth $R_z$ ($\mu$m) |  | 12 |  |  | 10.8 | 11.6 | 11.9 | 11.1 |
| Surface Quality | + | 0 | + | + | + | + | + | + |

Example 3
Charge of a High Molecular Emulsion Polymerizate Based Upon Methacrylate (Example 1) in a PVC Free Foam Receptacle in Comparison to a High Molecular Weight Emulsion Polymerizate Based on a Methacrylate/Acrylate in Accordance with the Disclosure of GB 2 139 629 A, Examples 1 Through 10.

The testing of a high molecular weight copolymerizate from Example 1 was carried out in a currently available free foam receptacle.

100 parts suspension polymerized PVC (K value 58/60)
5 parts chalk
4 parts butyl tin mercaptide
2.5 parts Calcium Stearate
2.7 parts Tracel 3140 ACR
8–12 parts high molecular weight polymerizate The vessel components were mixed in a commercially available heat/cool mixer to a preparation temperature of 115–120° C. and subsequently cooled to 40° C. in a cooling mixer. After 1-day's storage of the dry blend a foam extrusion was carried out in a twin screw extruder. After exiting from the tool, the PVC material foams in accordance with the free foam procedure. There is produced a 20 cm wide foam plate that is drawn off over a tempered rolling mill. The densities and quality of the surfaces of these prefoamed plates can then be determined.

As examples of currently available products, there were utilized as standards: a MMA/n-BA copolymerizate having a viscosity number of 750 cm$^3$/g (Standard 1) as well as one having a viscosity number of 950 cm$^3$/g (Standard 2). At a charge amount of 12 parts, these show a foam density of 0.55 g/cm$^3$ (Standard 1) as well as 0.52 cm$^3$/g (Standard 2).

At a lowering of the charge to 11 or 10 parts, there result higher foam densities. At less than 10 parts a rough and uneven surface is obtained.

On the other hand, if one charges the copolymer formed in Example 1 utilizing a charge amount of 12 parts, there is obtained a foam density of 0.45 g/cm³. A reduction of the charge amount down to 9 parts makes possible the obtaining of a constant surface product without increasing foam density.

Where 8 parts of the copolymer produced in Example 1 are charged, there is obtained substantially the same density as obtained with MMA/n-BA copolymers. The quality of the surface was determined by a surface roughness measuring apparatus (perthometer) produced by the Hoffman Company (Munich, Type: Surftest 301), as set forth in Table 2 below.

TABLE 2

| Processing Aid | Standard 1 | Standard 2 | Example 1 |
|---|---|---|---|
| Charge Amount parts/100 | 12 | 12 | 8 |
| Density g/cm³ | 0.55 | 0.52 | 0.49 |
| Average Roughness Depth $R_z$ (μm) | 12.8 | 15.0 | 10.5 |

Claims:

1. A foamable polyvinyl halide resin mass for formation foams of improved surface quality with reduced density comprising:
    A) 1–25 parts relative to 100 parts of the polyvinyl halide to be charged, of a polymerizate obtained through emulsion polymerization of
        i) from at least 20 parts up to 75 parts of methyl(meth) acrylate;
        ii) 25–80 parts of at least one $C_2$–$C_{18}$ alkyl(meth) acrylate; and
        iii) 0 to 5 parts of members of the group consisting of mono and polyvinylically unsaturated monomers copolymerizable with a member of the group consisting of (i) and (ii) above, wherein the components (i), (ii), (iii), together yield 100 parts, wherein the emulsion polymerizate is a one-step polymerizate having a viscosity number greater than 700 cm³/g;
    B) 0.1 to 10 parts based on 100 parts of the polyvinyl halide of at least one blowing agent, and
    C) 0 to 100 parts relative to 100 parts of the polyvinyl halide.

2. Process according to claim 1 additionally comprising up to 100 parts by weight based on 100 parts by weight of the sum of components A, B and C, of conventional additives.

3. Resin mass in accordance with claim 1 wherein component (ii) is $C_2$–$C_4$ alkylmethacrylate.

4. Resin mass in accordance with claim 1 wherein component (ii) is selected from the group consisting of n-butylmethacrylate and/or isobutylmethacrylate.

5. Resin mass in accordance with claim 4 wherein component (ii) is 25 to 40 parts of n-butylmethacrylate.

6. Resin mass in accordance with claim 4 wherein component (ii) is 60–80 parts of isobutylmethacrylate.

7. Resin mass in accordance with claim 1 wherein the viscosity number is in the region of 750–1200 cm³/g.

8. Resin mass in accordance with claim 7 wherein the viscosity number is in the range of 800–1100 cm³/g.

9. Resin mass in accordance with claim 1 that is freely foamable.

10. Process for the production of foams having improved surface quality reduced foam density comprises freely foaming 100 parts of a polyvinyl halide suspension in the presence of a composition of component A of claim 1 and a blowing agent of component B.

11. Process in accordance with claim 1 wherein the resin in a PVC resin.

12. Objects made of freely foamed polyhalo resin masses in accordance with claim 8.

* * * * *